Aug. 9, 1932.   P. A. E. HELLIGE   1,870,624
COLORIMETER
Filed Feb. 9, 1931   2 Sheets-Sheet 1
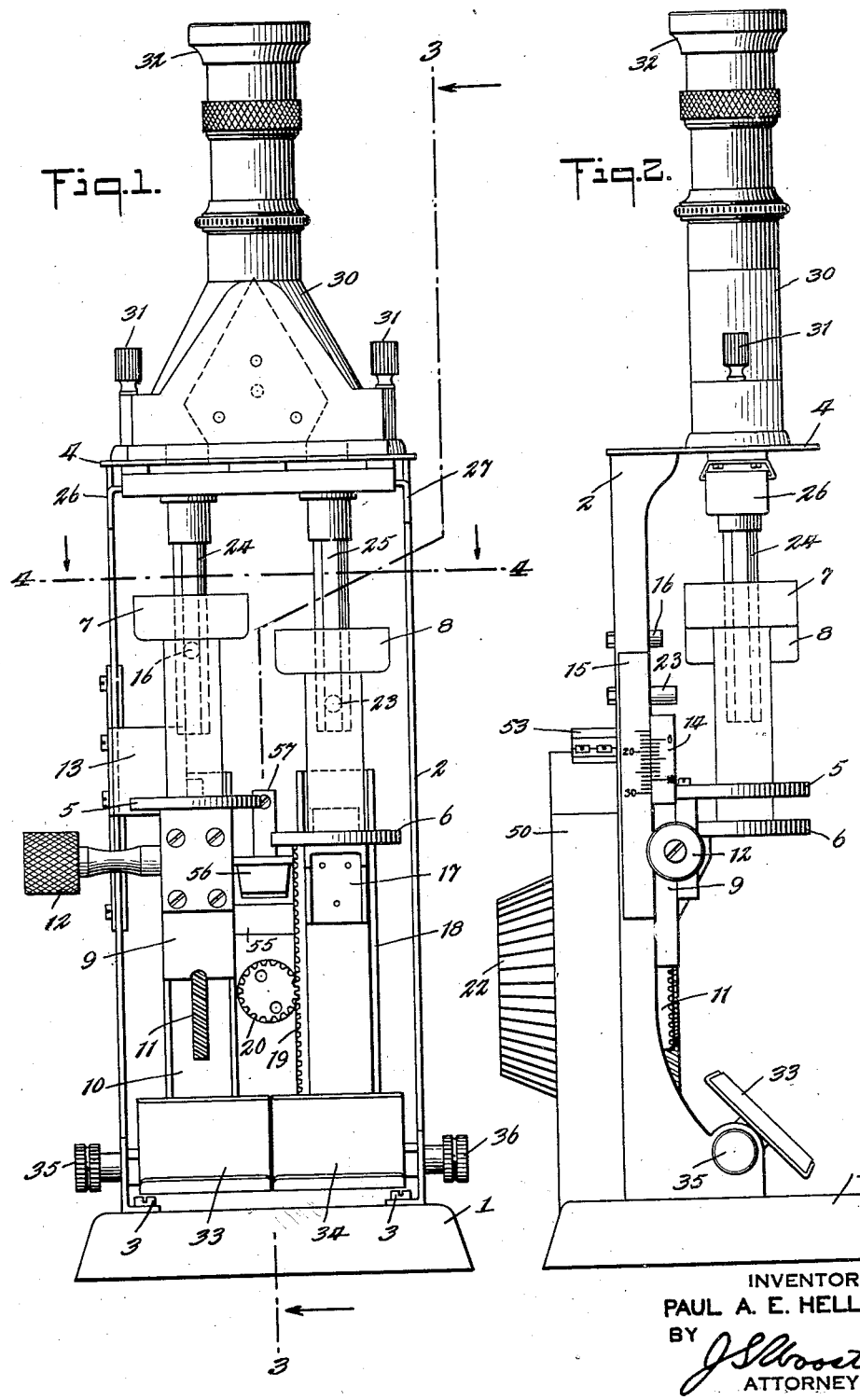
INVENTOR
PAUL A. E. HELLIGE
BY
ATTORNEY Aug. 9, 1932.  P. A. E. HELLIGE  1,870,624
COLORIMETER
Filed Feb. 9, 1931   2 Sheets-Sheet 2
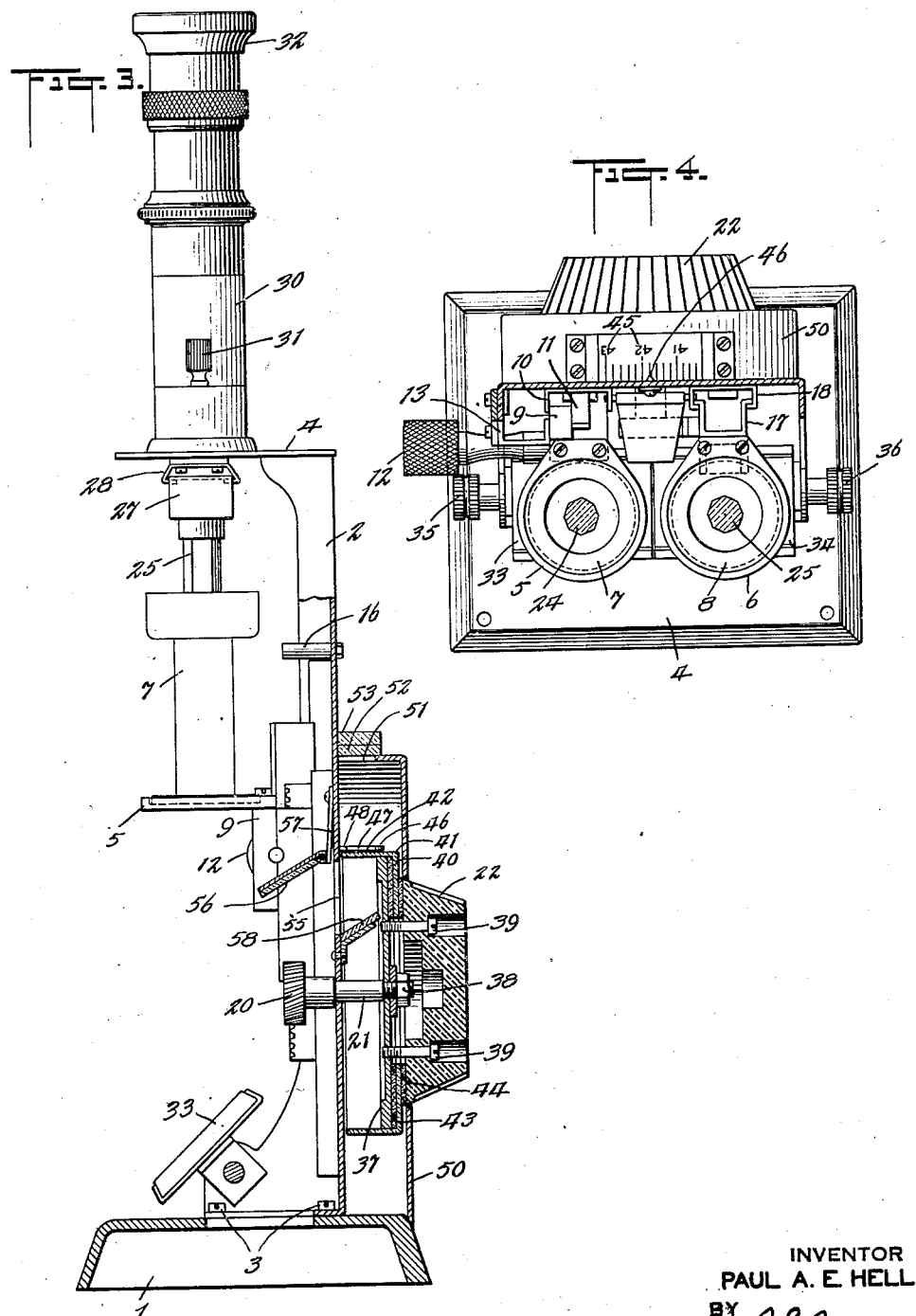
INVENTOR
PAUL A. E. HELLIGE
BY
ATTORNEY Patented Aug. 9, 1932

1,870,624

UNITED STATES PATENT OFFICE

PAUL A. E. HELLIGE, OF JACKSON HEIGHTS, NEW YORK

COLORIMETER

Application filed February 9, 1931. Serial No. 514,479.

This invention relates to colorimeters such as are used in the examination and analysis of colored liquids, bacterial solutions, and chemical mixtures in a liquid form.

The principal objects of the invention are to simplify the operation of instruments of this type, to facilitate rapid and accurate readings, and to reduce the strain on the operator's eyes with resulting saving in time and labor.

In general construction the colorimeter may be of any suitable type such as that disclosed in Patent #1,667,478 to R. E. Klett, dated April 24, 1928, having a pair of adjustable stages for supporting the standard and test solutions, and means including an eyepiece for comparing the color of the solutions at various depths. In making an analysis the stage containing the standard solution is usually set at an arbitrary position which need not be changed, so that the scale indicating the position of this stage may be placed on the side or other part of the instrument not readily seen by the operator when looking through the eyepiece.

The stage containing the test solution, however, must be adjusted carefully until the two bands of color viewed through the eyepiece become equal in intensity, and my invention simplifies this adjustment as well as the subsequent computations by providing a dial for the test stage which may be read directly from the general position of the eyepiece. In the preferred form of the invention this dial consists of a rotatable disc having a calibrated rim or flange made of light pervious material, and is illuminated on the inside by natural or artificial light which preferably enters from the same direction as the light illuminating the standard and test solutions. Since the instrument is always faced in a direction to admit light to the solutions, the dial likewise will always be illuminated and clearly visible to the operator without even turning his head.

When the operator takes a reading on an instrument of this type he usually computes the analysis by comparing the two readings on a chart conveniently located in the base of the instrument or elsewhere. Since he already knows the position of the standard solution, and since in my device he observes the position of the test solution the instant the colors match, it is a simple matter to compare the readings on the chart.

The invention will be described in connection with the accompanying drawings, in which:

Fig. 1 is a front elevation of a colorimeter embodying the invention;

Fig. 2 is a side view showing the position of the rotatable dial;

Fig. 3 is a vertical section taken on the line 3—3 of Fig. 1; and

Fig. 4 is a transverse section taken on the line 4—4 of Fig. 1.

In the drawings, the frame consists of a base 1, an upright 2 secured to the base by screws 3, and a shelf 4 secured to the top of the upright so that it overhangs the base.

The standard and test solutions are supported on annular stages or platforms 5 and 6, respectively, which may be moved up or down independently. Since these stages are recessed or ringshaped, they allow light rays from below to pass up through the glass cups 7 and 8 which contain the standard and test solutions.

The stage 5 for the standard solution is supported on a bracket 9 which slides in a vertical track 10 secured to the upright 2. A stationary rack 11 between the edges of the track 10 meshes with a pinion which is carried by the bracket 9 and is rotated by turning the knurled knob 12, thus raising or lowering the stage 5. The bracket 9 also has an extension 13 provided on its outer edge with a vernier 14 registering with the scale 15 on the edge of the upright 2. Movement of the bracket 9 in either direction is limited by suitable stops 16 secured to the upright 2.

The stage 6 for the test solution is supported on a bracket 17 which slides in a vertical track 18 secured to the upright 2 parallel with the track 10. The bracket 17 carries a rack 19 on one edge, preferably the inner edge. This rack meshes with a pinion 20 carried by a rotatable shaft 21 extending through the upright 2 toward the back of the instrument and operated by a knob 22. Movement of the bracket 17 in either direction is limited by suitable stops 23 secured to the upright 2.

A pair of hollow tubes 24 and 25 are attached to plates 26 and 27, respectively, which are slipped into opposite ends of a clip or track 28 on the under side of the shelf 4 so that the tubes 24 and 25 lie parallel to each other and directly over the open central portions of the stages 5 and 6, respectively. The tubes 24 and 25 are the usual type made of black opaque glass having fused lenses at their upper and lower ends.

A casing 30 is secured to the upper side of the shelf 4 by means of screws 31, and contains the usual lens and prisms so arranged that light rays passing through the standard and test solutions, and tubes 24 and 25, are reflected into the color observing eyepiece 32. Reflectors 33 and 34, of the usual type having an opaque light reflecting surface, are pivoted on the lower end of the upright 2 directly beneath the stages 5 and 6, respectively. These reflectors may be adjusted independently by means of knurled knobs 35 and 36 so that the light may be dispersed uniformly through the two solutions.

An important feature of the invention resides in the means for giving a direct indication of the adjustment of the stage 6 supporting the test solution. As previously stated, this stage is adjusted by turning the knob 22 which rotates the pinion 20 secured to one end of the rotatable shaft 21. At its opposite end the shaft 21 is clamped to a metal or other disc 37 by means of a nut and suitable washers 38. The knob 22 is secured to the disc 37 by means of screws 39, and between the adjacent faces of the knob 22 and disc 37 I clamp the annular wall 40 of a cup-shaped dial 41 which has a peripheral rim or flange 42 extending almost to the wall of the upright 2.

The dial 41 is preferably made of frosted glass or other light pervious material, and I therefore provide annular rings 43 and 44 of rubber, cork or other cushioning material on opposite sides of the wall 40 to avoid injuring the glass and to provide the desired frictional lock between disc 37, dial 41 and knob 22. The cushioning ring 44 may be cemented to the inner face of the knob 22 to facilitate assembly. A scale 45 is calibrated on the glass rim 42, as shown in Fig. 4, so that light rays directed upwardly through the rim make the graduations of the scale clearly visible from the general position of the eyepiece 32. A plate 46 is secured to the upright 2 overhanging the scale 45 and has a small central slot 47 which conceals all but the top of the scale from view. A pointer 48 in the center of the slot 47 cooperates with the scale 45.

The dial 41 is enclosed in a housing 50 which is secured to the upright 2 and has an opening 51 at the top directly above the slot 47, giving the operator a clear view of the scale 45. The opening 51 is sealed by a glass 52 which excludes dust, and a magnifying glass 53 which enables the operator to read the scale 45 without lowering his head from the eyepiece 32.

Light rays reach the inside of the dial 41 underneath the glass rim 42 through an aperture 55 in the upright 2 between the tracks 10 and 18. In the preferred form of the invention, I provide a mirror 56 which is pivoted between the tracks 10 and 18 and controlled by a leaf spring 57, and a stationary mirror 58 inside the aperture 55 and secured to the upright 2 with the reflecting surface at an angle of about 45 degrees to the upright and directly beneath the slot 47.

It will be evident that the natural or artificial light which illuminates the cups 7 and 8 containing the standard and test solutions will also illuminate the scale 45 on the glass rim 42. With the mirror 56 in the position shown in Fig. 3 light rays reflected by the reflectors 33 and 34 will also be reflected upon the mirror 58, illuminating the scale 45. The mirror 56 is especially useful with artificial light such as a daylight bulb placed near the reflectors 33 and 34, but in any case it is impossible to cut off the light to the scale 45 so long as the standard and test solutions are properly illuminated.

It will be understood that various changes may be made in the details of construction herein shown and described without departing from the scope and spirit of the invention as defined by the appended claims.

The invention claimed is:

1. A colorimeter comprising a frame, a pair of adjustable stages on the front of said frame for supporting standard and test solutions, means including an eyepiece at the top of said frame for comparing the color of said solutions, means for raising and lowering one stage and for indicating the effective depth of its solution with respect to the eyepiece, means including a rotatable shaft for raising and lowering the other stage, a dial at the back of said frame operated by said shaft and having a light pervious flange provided with calibrations readable from the general position of said eyepiece, a reflector on the front of said frame adapted to throw light underneath said solutions, and means for directing light from said reflector underneath said dial flange to illuminate it.

2. A colorimeter comprising a frame, a pair of adjustable stages on the front of said frame for supporting standard and test solutions, means including an eyepiece at the top of said frame for comparing the color of said solutions, means for raising and lowering one stage and for indicating the effective depth of its solution with respect to the eyepiece, means including a rotatable shaft for raising and lowering the other stage, a dial at the back of said frame operated by said shaft and having a light pervious flange provided with calibrations readable from the general position of said eyepiece, and a housing for said dial having an opening leading from the front of said frame into the interior of the dial to illuminate said flange.

3. A colorimeter comprising a frame, a pair of adjustable stages on the front of said frame for supporting standard and test solutions, means including an eyepiece at the top of said frame for comparing the color of said solutions, means for raising and lowering one stage and for indicating the effective depth of its solution with respect to the eyepiece, means including a rotatable shaft for raising and lowering the other stage, a dial at the back of said frame operated by said shaft and having a light pervious flange provided with calibrations readable from the general position of said eyepiece, a housing for said dial having an opening leading from the front of said frame to the interior of the dial, and a mirror adjacent said opening at an angle adapted to reflect light upon said flange.

4. A colorimeter comprising a pair of adjustable stages for supporting standard and test solutions, means including an eyepiece for comparing the color of said solutions, means for raising and lowering one stage and for indicating the effective depth of its solution with respect to the eyepiece, means including a rotatable shaft for raising and lowering the other stage, a dial operated by said shaft having a light pervious flange provided with calibrations readable from the general position of said eyepiece, a housing for said dial having an opening leading to the interior of the dial, a mirror inside said opening at an angle adapted to reflect light upon said flange, and a second mirror pivoted to the outside of the housing adjacent said opening and adapted to be moved into position to reflect light from an outside source upon the first-mentioned mirror.

5. A colorimeter comprising a pair of adjustable stages for supporting standard and test solutions, means including an eyepiece for comprising the color of said solutions, means for raising and lowering one stage and for indicating the effective depth of its solution with respect to the eyepiece, means including a rotatable shaft for raising and lowering the other stage, a dial operated by said shaft having a light pervious flange provided with calibrations readable from the general position of said eyepiece, a housing for said dial having an opening leading to the interior of the dial, a mirror inside said opening at an angle adapted to reflect light upon said flange, a reflector beneath said stages adapted to throw light beneath said solutions, and a second mirror outside the housing adjacent said opening in position to reflect light from said reflector upon the first-mentioned mirror.

6. A colorimeter comprising a frame, a pair of vertical tracks on the front of said frame, a pair of stages movable up and down in said tracks and adapted to support standard and test solutions, means including an eyepiece at the top of said frame for comparing the color of said solutions, means for raising and lowering one stage and for indicating the effective depth of its solution with respect to the eyepiece, means including a rotatable shaft for raising and lowering the other stage, a dial at the back of said frame operated by said shaft and having a light pervious flange provided with calibrations readable from the general position of said eyepiece, and a housing for said dial having an opening between said tracks and leading from the front of said frame into the interior of the dial to illuminate said flange.

Signed at New York, in the county of New York and State of New York this 7th day of February A. D. 1931.

PAUL A. E. HELLIGE.